(12) United States Patent
Gile et al.

(10) Patent No.: US 11,007,985 B2
(45) Date of Patent: May 18, 2021

(54) AUTOMOTIVE SERVICE SYSTEM

(71) Applicant: CMT Group LLC, Cleveland Heights, OH (US)

(72) Inventors: Trevor Gile, Cleveland Heights, OH (US); Charles Gile, Cleveland Heights, OH (US)

(73) Assignee: CMT Group LLC, Cleveland Heights, OH (US)

( * ) Notice: Subject to any disclaimer, the term of this patent is extended or adjusted under 35 U.S.C. 154(b) by 201 days.

(21) Appl. No.: 16/153,854

(22) Filed: Oct. 8, 2018

(65) Prior Publication Data

US 2019/0248343 A1 Aug. 15, 2019

Related U.S. Application Data

(63) Continuation of application No. 15/894,984, filed on Feb. 13, 2018, now Pat. No. 10,150,455.

(51) Int. Cl.
| | |
|---|---|
| *B60S 5/00* | (2006.01) |
| *B65G 15/12* | (2006.01) |
| *B25H 5/00* | (2006.01) |
| *G06K 9/00* | (2006.01) |
| *B65G 47/66* | (2006.01) |
| *B60S 13/00* | (2006.01) |
| *F01M 11/04* | (2006.01) |
| *F16N 31/00* | (2006.01) |

(52) U.S. Cl.
CPC ............. *B60S 5/00* (2013.01); *B25H 5/00* (2013.01); *B60S 13/00* (2013.01); *B65G 15/12* (2013.01); *B65G 47/66* (2013.01); *F01M 11/04* (2013.01); *F16N 31/00* (2013.01); *G06K 9/00671* (2013.01); *B65G 2201/0294* (2013.01)

(58) Field of Classification Search
CPC ......... Y10T 137/3802; Y10T 29/53543; B60S 5/00; E04H 5/06; B62D 65/18; B23P 2700/50; B65G 2201/0294; B65G 47/66
USPC .......................... 414/222.03, 751.1; 198/600
See application file for complete search history.

(56) References Cited

U.S. PATENT DOCUMENTS

| | | | |
|---|---|---|---|
| 1,586,208 A | 5/1926 | Maybach | |
| 2,105,761 A | 1/1938 | Wood | |
| 2,477,450 A | 7/1949 | Gray | |
| 4,193,487 A | 3/1980 | Takeuchi | |
| 4,789,047 A | 12/1988 | Knobloch | |
| 4,987,973 A | 1/1991 | Cody | |
| 5,074,380 A | 12/1991 | Bedi | |
| 6,073,666 A | 6/2000 | Clark | |
| 6,102,159 A | 8/2000 | Rogate | |
| 6,866,195 B2* | 3/2005 | Knowles | G06Q 10/087 235/375 |
| 7,530,152 B2* | 5/2009 | Giarrizzo, Jr. | B23P 6/00 29/402.08 |

(Continued)

*Primary Examiner* — Jason L Vaughan
(74) *Attorney, Agent, or Firm* — Renner, Otto, Boisselle & Sklar, LLP (57) ABSTRACT

A service system for servicing a vehicle includes a service station and a parts locker array disposed in or adjacent the service station and including: a plurality of parts lockers. Each parts locker includes a locker access door configured to alternatively open and close to permit and impede, respectively, access to the parts locker's interior, and a locker locking mechanism configured to alternatively lock and unlock to impede and permit, respectively, opening of the parts locker access door.

12 Claims, 10 Drawing Sheets

(56) References Cited

U.S. PATENT DOCUMENTS

| | | | |
|---|---|---|---|
| 7,874,057 B1 | 1/2011 | Rickards | |
| 10,363,907 B2 * | 7/2019 | Erwin | F01M 11/0458 |
| 10,421,440 B2 * | 9/2019 | Merg | G07C 5/0808 |
| 10,733,548 B2 * | 8/2020 | Merg | H04W 12/08 |
| 2010/0108467 A1 | 5/2010 | Barreyre | |
| 2018/0345811 A1 * | 12/2018 | Michels | G05D 1/0088 |
| 2019/0023236 A1 * | 1/2019 | Webb | H02S 10/40 |
| 2020/0290574 A1 * | 9/2020 | Svensson | B60W 50/00 |

\* cited by examiner

AUTOMOTIVE SERVICE SYSTEM

BACKGROUND

Vehicles such as cars and trucks need routine maintenance. Automotive service facilities periodically perform a number of tasks on vehicles in order to keep them in proper working condition. Some of these tasks include tire rotation, fluid changes (e.g., oil, automatic transmission fluid, coolant, etc.), and fluid refills (e.g., windshield wiper fluid, etc.) Conventionally, technicians performed these tasks in a garage or service bay.

Some tasks (e.g., oil filter changes, etc.) require the garage or service bay to include an elevation device, such as a hydraulic lift, to lift the vehicle above the ground. Some of these same tasks may, in the alternative, require the garage or service bay to include a pit or basement so that the technician may access the underside of the vehicle while the vehicle is on the ground. For example, a technician may perform an oil change by standing in a pit or basement located under the vehicle to access the vehicle's underside.

In the conventional garage or service bay, technicians perform maintenance tasks one at a time until completing all of the desired tasks. Performing all of the required tasks simultaneously is not realistic because multiple technicians would have to work on the vehicle at the same time, getting in each other's way. Aside from this, some of tasks may require the use of a lift and some may not, making coordination difficult. Also, conventional garages or service bays need equipped with a large number of different equipment, making the space cluttered. The large number of different equipment may be moved in and out of the space but this may be tedious and time-consuming.

But customers demand fast service and convenience. Service facilities also prefer fast service because it allows for a larger volume of vehicles served. For a service facility with only a limited number of service bays, extended service time results in lost business and customer dissatisfaction because a vehicle cannot be brought in to the facility for service unless there is an open service bay in which to service the vehicle.

Increasingly, customers also demand transparency in service. Conventional service facilities had waiting rooms for customers to wait or, worse yet, required customers to leave the facility while maintenance was being performed. Customers often questioned, with little recourse, whether the maintenance work was actually performed. Often, when an unexpected costly repair was necessary, the customer was surprised and had to take the word of the technician as to whether the work was actually needed.

Another conventional problem is the variety of parts and specifications of the various vehicle brands, models, etc. Beyond the complexity of individual parts of a vehicle, the many options that are available in body style, engine size and type, transmission, and accessory equipment further complicate the specifications. In some cases manufacturers change specifications after manufacturing because of design improvements, safety recalls, etc. Therefore, in addition to the time spent actually servicing the vehicle, maintenance facilities must spend time obtaining, locating and retrieving the relevant parts and specifications for the specific vehicle they happen to be servicing at the time.

Therefore, there is a need for an automotive service facility that increases speed, transparency, and accuracy in vehicle service.

SUMMARY OF THE INVENTION

The present disclosure provides a service line for servicing a vehicle. The service line includes stations disposed in a serial direction along the service line, each station including a pair of conveyors disposed along the serial direction. At each station, particular tasks may be performed. The stations may be arranged sequentially one after the other with the conveyors facilitating the transfer of vehicles from one station to the next.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
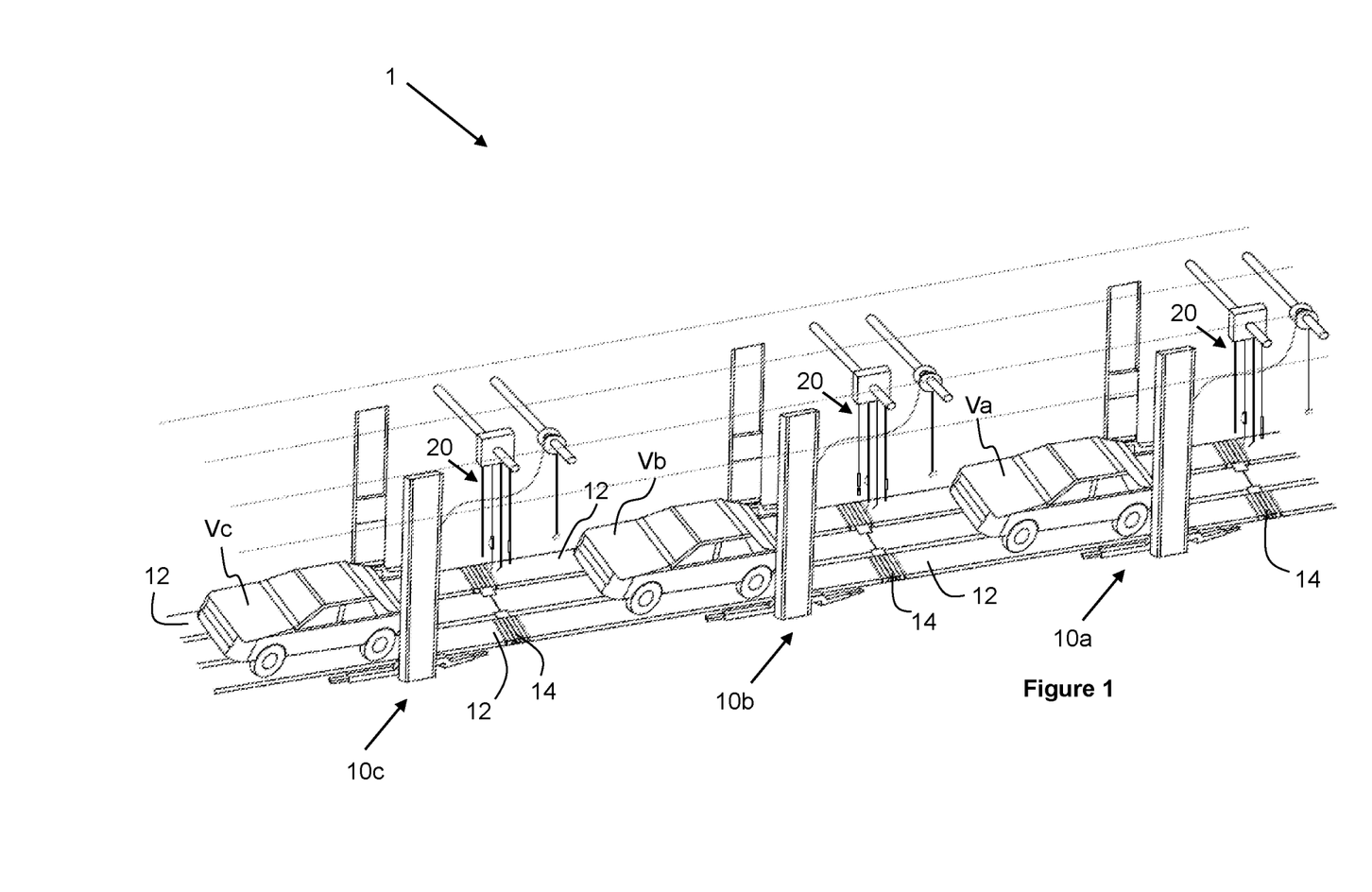
FIGS. 1 and 2 illustrate perspective and side views of an exemplary service line for servicing and performing maintenance of vehicles in an assembly-line fashion.
Figure 2:
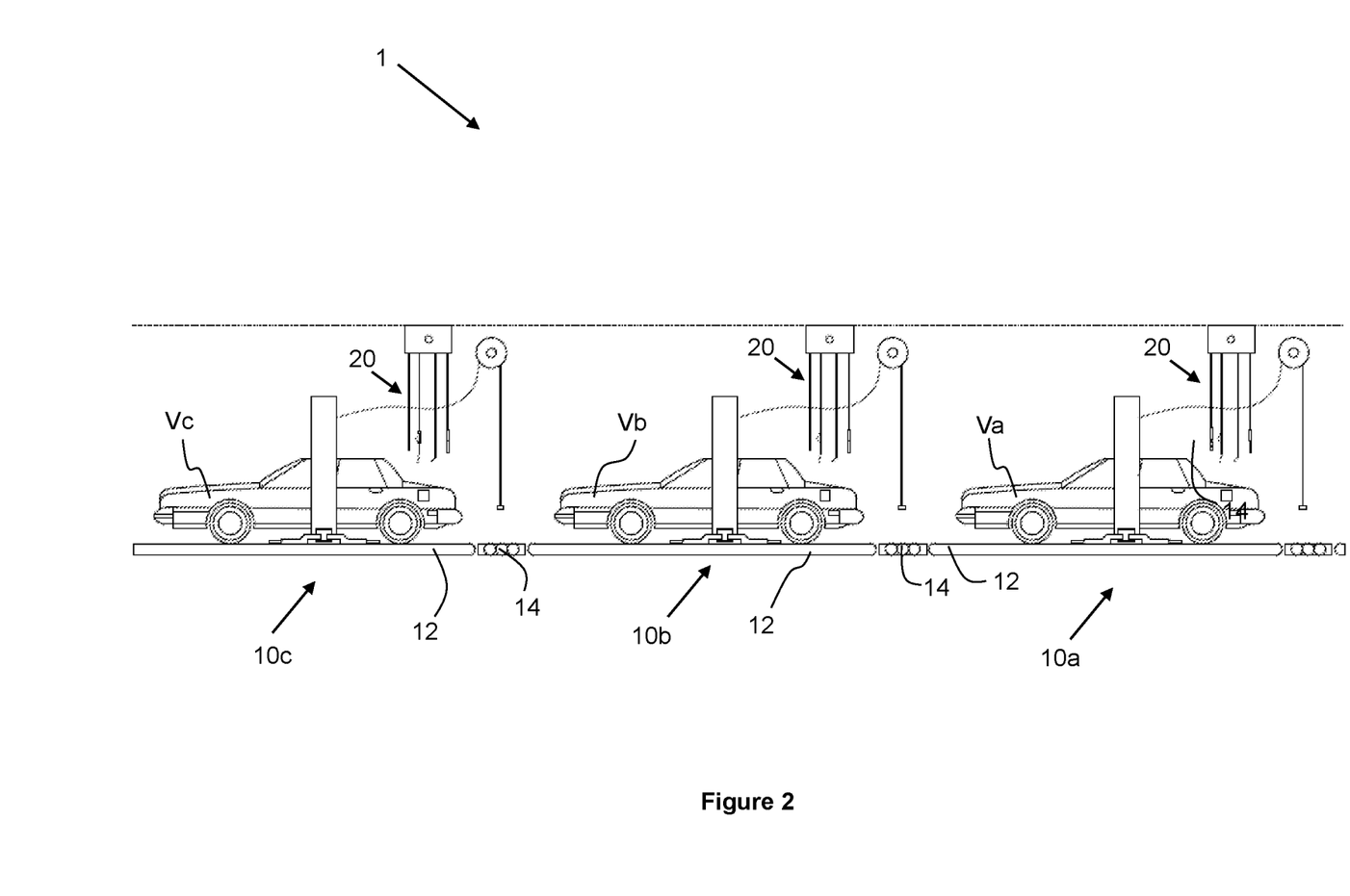

FIGS. 1 and 2 illustrate perspective and side views of an exemplary service line 1 for servicing and performing maintenance of vehicles Va-Vc in an assembly-line fashion, to provide greater efficiency. The service line 1 enables the servicing of two to three times the number of vehicles that would otherwise be possible in the same amount of time using conventional systems and methods.

The service line 1 may include a number of stations 10a-10c stations disposed in a serial direction along the service line 1. Each station 10 may include a pair of conveyors 12 disposed along the serial direction to support and convey one or more vehicles along the service line 1. For example, a first station 10a may include a driver side conveyor 12 that supports and conveys driver side tires of the vehicle Va and a passenger side conveyor 12 that supports and conveys passenger side tires of the vehicle Va, while a second station 10b may include a driver side conveyor 12 that supports and conveys driver side tires of the vehicle Vb and a passenger side conveyor 12 that supports and conveys passenger side tires of the vehicle Vb. While on FIGS. 1 and 2 stations 10 are shown as supporting one vehicle each, on other embodiments each station 10 may support two or more vehicles.

Figure 3:
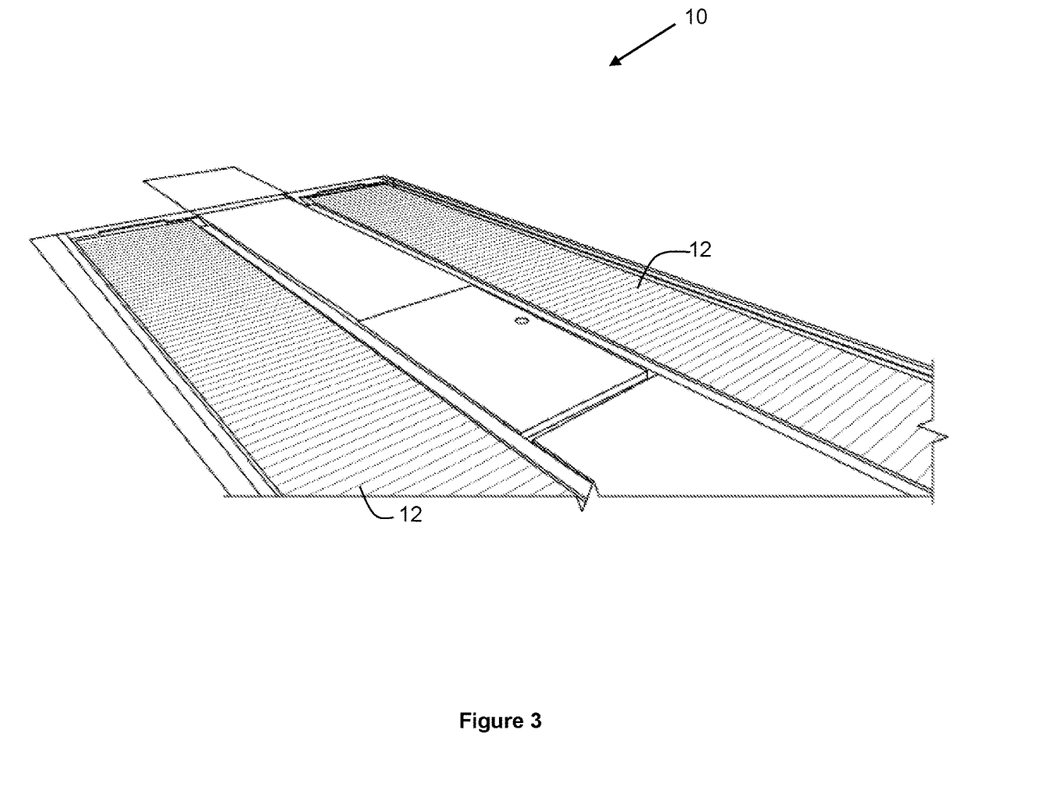
FIG. 3 illustrates a more detailed perspective view of a station of the exemplary service line of FIG. 1.

FIG. 3 illustrates a more detailed perspective view of a station 10 and particularly conveyors 12. The conveyors 12 may be belts, tracks, or similar arrangements that allow for the support and conveyance of the vehicle V along the service line 1.

Figure 4A:
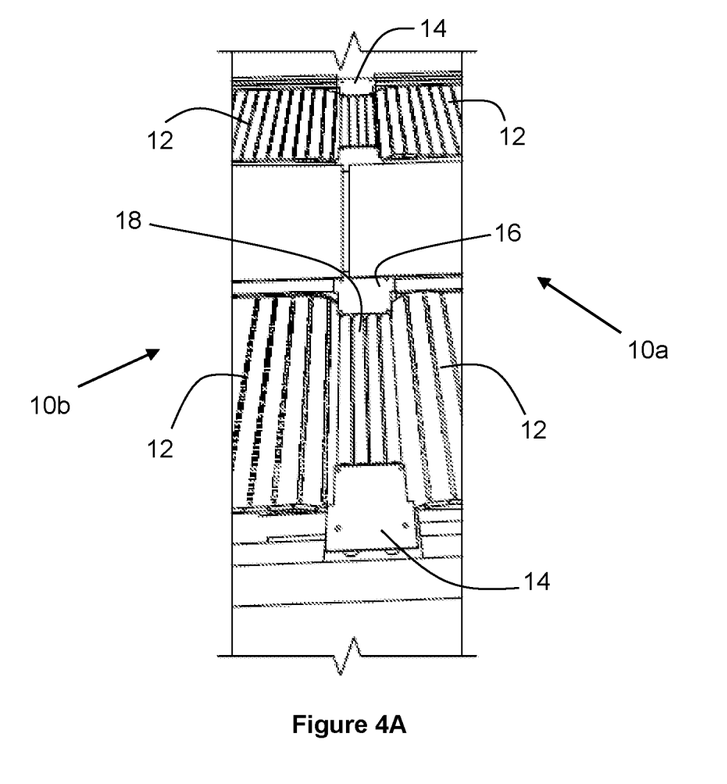
FIGS. 4A and 4B illustrate perspective and side detailed views of the transition area from a first station to a second station.
Figure 4B:
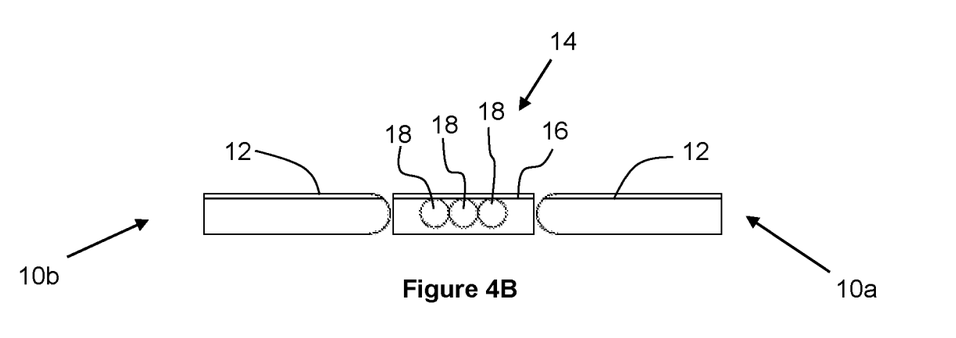

FIGS. 4A and 4B illustrate perspective and side detailed views of the transition from the first station 10a to the second station 10b. The conveyors may be arranged end-to-end near but separate from each other. Transition plates 14 may be used to ease the transition of the vehicles tires from the conveyors of one station to the next. For example, a driver side transition plate 14 may be disposed between the driver side conveyors 12 to allow a vehicle to be transported from one conveyor to the next along the service line. Similarly, a passenger side transition plate 14 may be disposed between the passenger side conveyors 12 to allow the vehicle to be transported from one conveyor to the next along the service line.

The transition plates 14 may include plates 16 that hold rollers 18 which rotate in the serial direction. The rollers 18 may be cylinders, spheres, etc. Thus, a vehicle's tire would travel from a conveyor 12 to a transition plate 14 that allows the tire to roll across to the next conveyor 12. The transition plates 14 may be configured such that, when corresponding conveyors convey the vehicle along the serial direction, the rollers 18 may rotate along the serial direction as well. However, primarily for safety reasons, the rollers 18 may lock to prevent rotation in the serial direction when the corresponding conveyors are stopped.

Returning to FIGS. 1 and 2, vehicles V may enter the service line 1 at an entry point on to station 10a. Thereafter, the conveyors 12 and transition plates 14 may convey the vehicles V along the service line 1 from one station to the next and finally to an exit point off station 10c. Technicians at each station 10 may control when their respective conveyors need activated so as to pass the vehicle V along to the next station.

Each of the stations 10 may include at least one service substation including, for example, an oil change substation, a tire rotation substation, and a lift substation. The stations may be arranged in any order. Each station may be equipped with the various machinery (hoses for dispensing fluids, wheel balancers, etc.), tools and supplies (fluids, parts, etc.) necessary for the tasks that are to be performed at the station. One or more stations 10 may include a variety of hoses 20 supported overhead from, for example, the service facility's roof trusses. The hoses 20 may be used to transport various types of engine oil, windshield washer fluid, brake fluid, transmission fluid, etc. to provide maintenance and service to the vehicle V.

Figure 5:
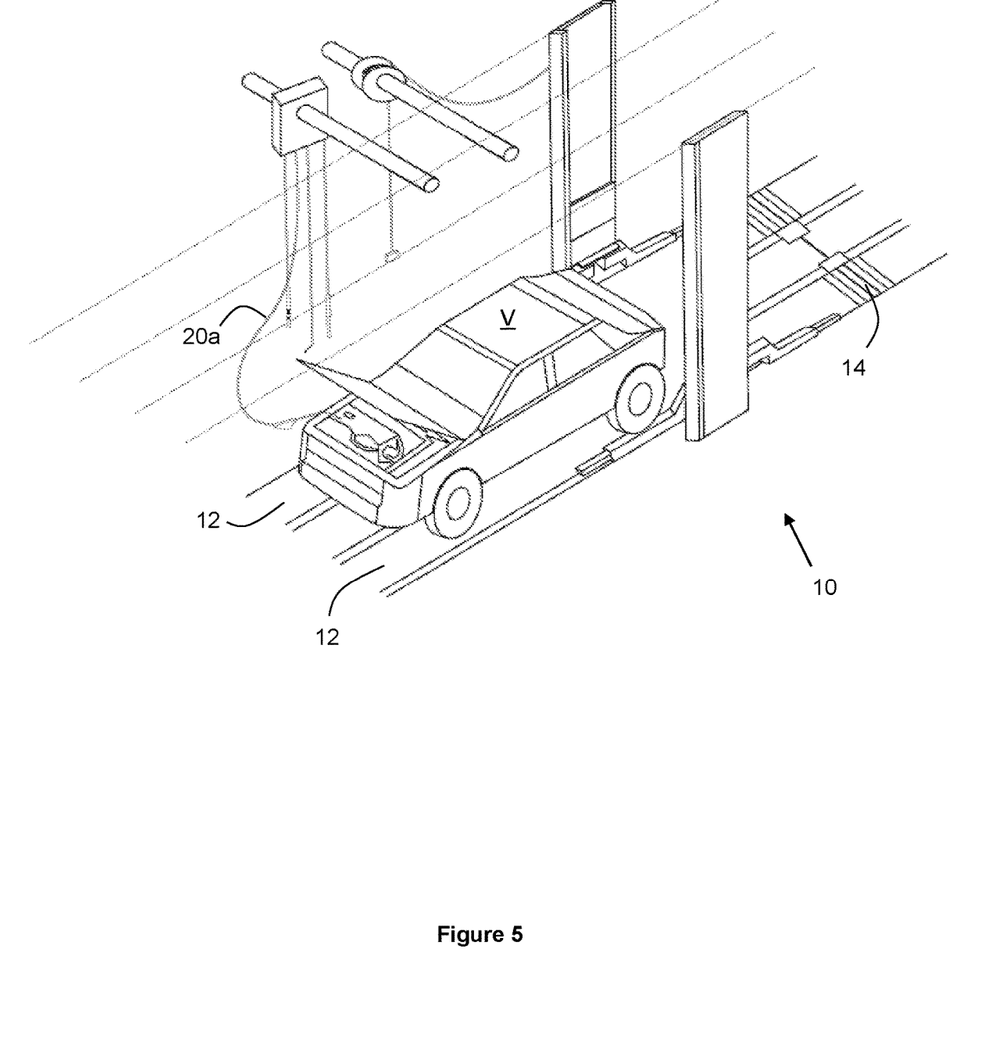
FIG. 5 illustrates an exemplary oil change substation.

FIG. 5 illustrates an exemplary oil change substation that may include a hose 20a and a vacuum-inducing device (not shown). The hose 20a has a first end that operably connects to the vacuum-inducing device and a second end that, as shown in FIG. 5, may be introduced in the vehicle's engine through the oil replacement opening or the dip stick tube. The vacuum-inducing device may then be activated to suction out oil from the oil reservoir of the vehicle through the hose 20a. This method of siphoning out engine oil from the top obviates the need for access to the bottom of the vehicle V and the need to rely on gravity to remove the oil.

Figure 6:
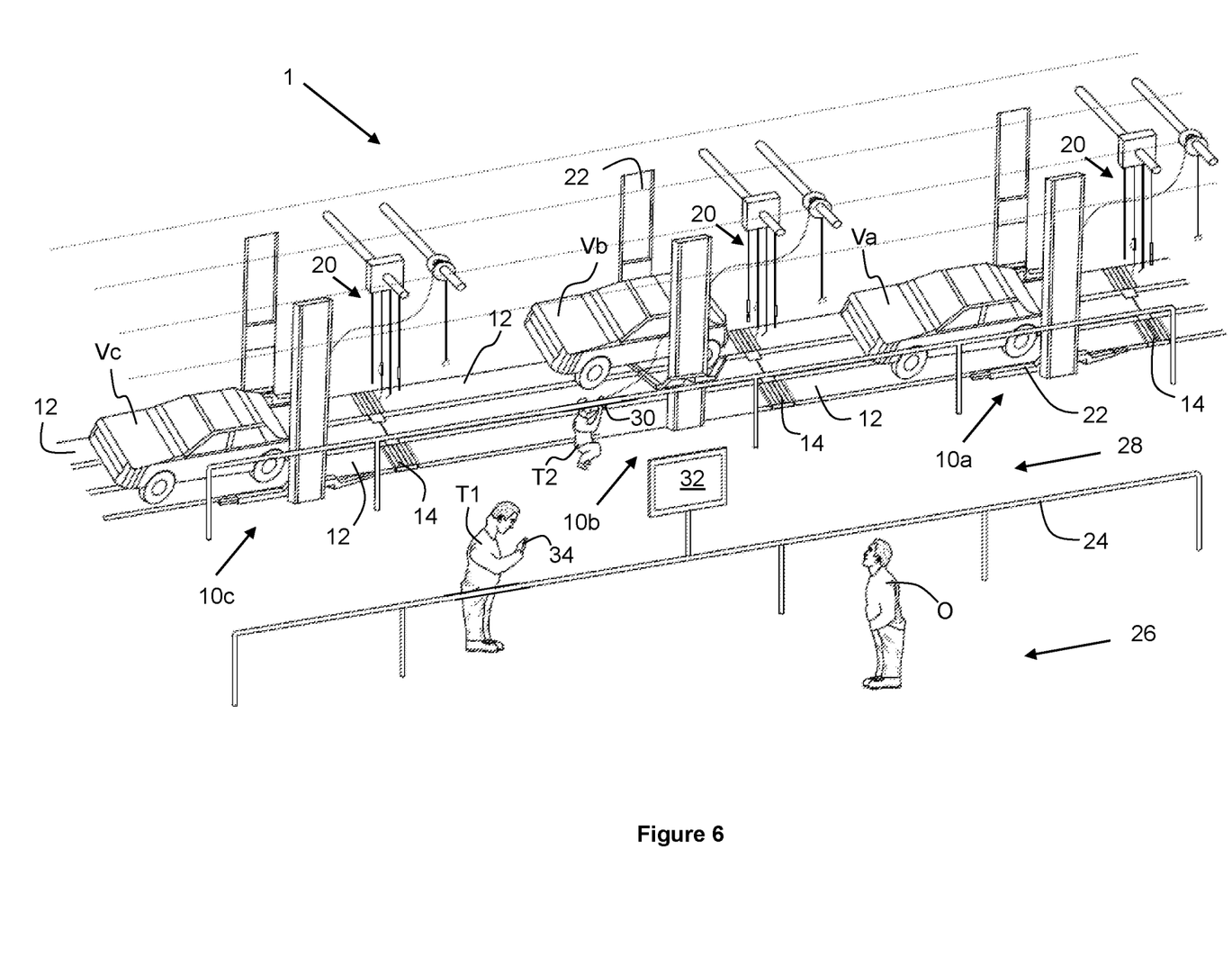
FIG. 6 illustrates the exemplary service line of FIG. 1 with additional details.

FIG. 6 illustrates the exemplary service line 1 with additional details. The stations 10 may include lifts 22 to lift the vehicle V off the conveyors 12 to allow a technician access to the bottom of the vehicle to, for example, perform work such as removing an oil filter. A lift 22 may be positioned underneath the vehicle V and a technician may activate the lift 22 to raise the vehicle V above ground level to, for example, rotate the tires of the vehicle V.

In one embodiment, the lifts 22 act in concert with the conveyors 12 and the rollers 18 of the transition plates 14 such that, when the lifts 22 lift a vehicle V off the conveyors 12, the conveyors 12 are stopped and the rollers 18 are locked to prevent rotation in the serial direction.

The service line 1 may also include a barrier 24 and two parallel paths 26, 28 disposed along the serial direction and adjacent the stations 10. In the embodiment, of FIG. 6, the barrier 24 is disposed between the parallel paths 26 and 28. The owner O of a vehicle V being serviced may walk along the path 26 to observe his vehicle being serviced while remaining on a safe area away from the stations 10 and protected by the barrier 24. A technician T1 may walk or stand along the parallel path 28 to, for example, describe the service being performed to the owner O. This facilitates a more customer-friendly environment and increases transparency.

The stations 10 may also include a camera 30 that may be wireless or, as shown in FIG. 6, connected to a wire supported overhead from, for example, the service facility's roof trusses. In the example of FIG. 6, a technician T2 uses the lift 22 to lift the vehicle Vb and the camera 30 to capture an image of a portion of the bottom of vehicle Vb. The service line 1 may also include a display 32 adjacent the parallel paths 26 and 28. The technician T2 may use the camera 30 to transmit an image to the display 32 and, this way, show the owner O portions of the vehicle V that may, for example, need service while the owner O remains at a safe location away from the stations 10 and protected by the barrier 24.

The service line 1 may also include at least one wireless tablet 34 that may receive the image from the camera 30 in addition to other information relating to the vehicle V being serviced. The technician T1 may use the tablet 34 to interact with the owner O to, again, facilitate a more customer-friendly environment and increase transparency in service.

Figure 7:
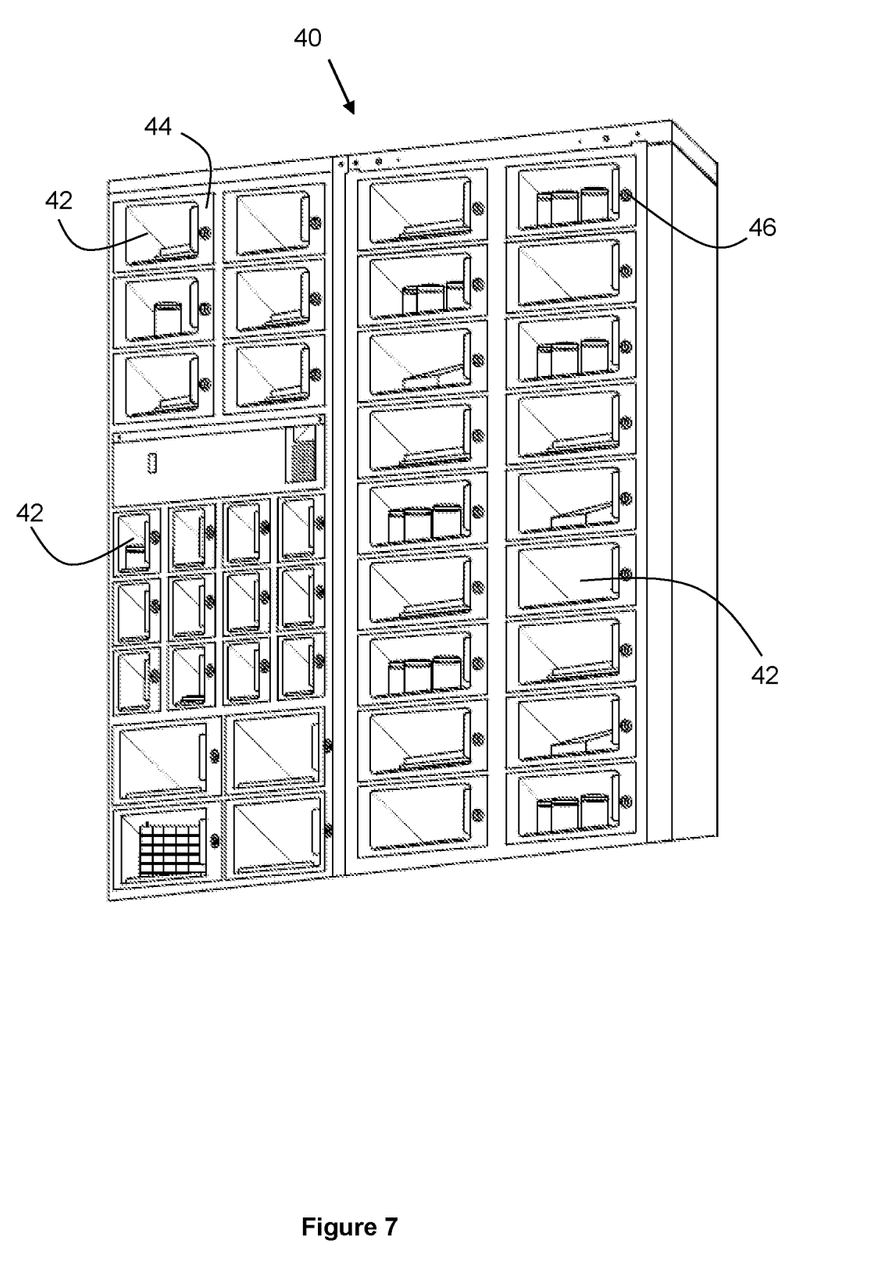
FIG. 7 illustrates an exemplary parts locker array.

FIG. 7 illustrates an exemplary parts locker array 40 that includes parts lockers 42. Each parts locker 42 includes a locker access door 44 that may alternatively open and close to permit and impede, respectively, access to the parts locker's interior. Each parts locker 42 may also include a locker locking mechanism 46 that alternatively locks and unlocks to impede and permit, respectively, opening of the parts locker access door 44. The parts locker array 40 may also include a locker array controller that communicates locker unlocking instructions upon validation of vehicle identifying information. The locker array controller may transmit the unlocking instructions to a specific one of the locker locking mechanism 46 based on the vehicle identifying information to unlock a respective locker access door 44 and permit access to parts in the parts locker 42 that specifically correspond to the vehicle. For example, based on a Vehicle Identification Number (VIN), the locker array controller may permit access to parts that specifically correspond to the vehicle as identified by the VIN.

Figure 8:
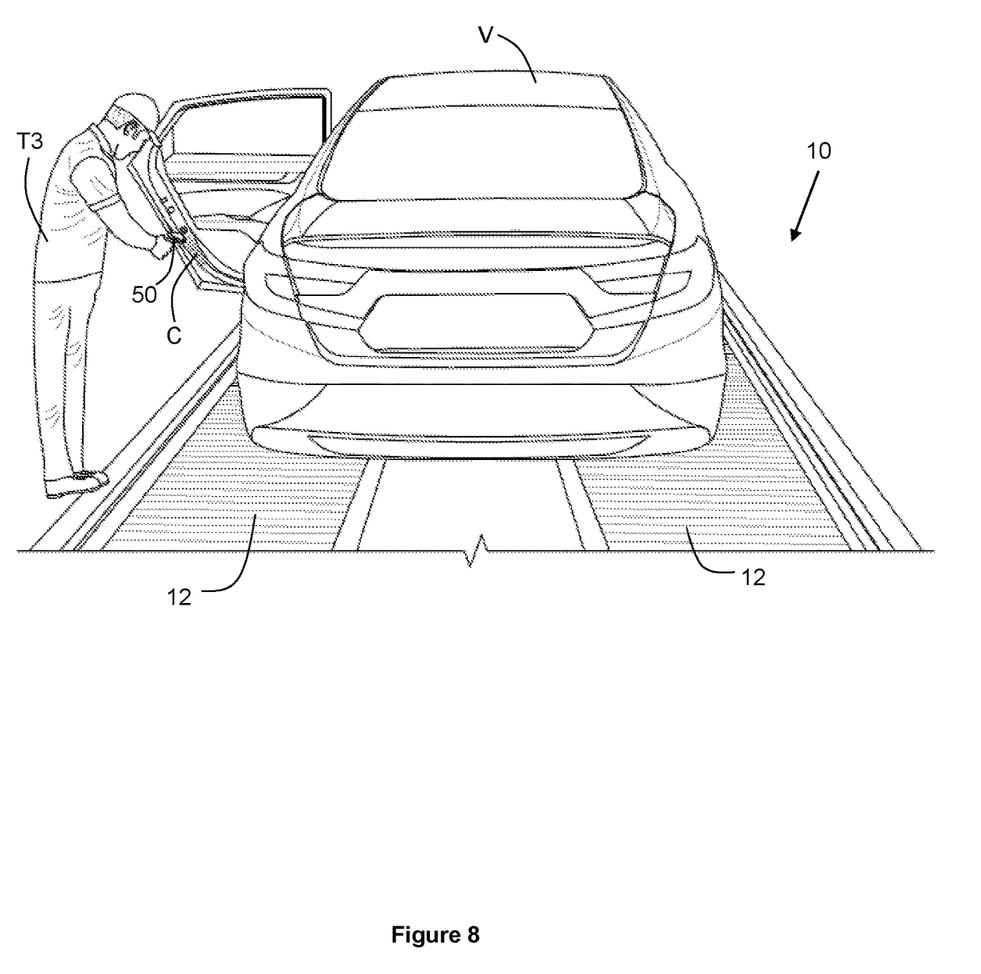
FIG. 8 illustrates a perspective view of the service line 1 in use.

FIG. 8 illustrates a perspective view of the service line 1 in use. The service line 1 may include an optical scanner 50 configured to scan vehicle identifying information recorded on a code C on the surface of the vehicle V. A technician T3 may use the scanner 50 to, for example, scan a VIN number printed on a surface of the vehicle V. The service line 1 may also include a main controller operably connected (wired or wireless) to the scanner 50 and configured to receive the vehicle identifying information from the scanner 50. Based on the vehicle identifying information, the main controller may identify the vehicle (e.g., make, model, year, owner, owner's address, license plate, etc.) manufacturer's recommended maintenance procedures corresponding to the specific vehicle V, service history of the vehicle V, automotive components or parts corresponding to the vehicle V, etc.

In one embodiment, the technician T3 may use the scanner 50 to scan the vehicle identifying information C of the vehicle V. Based on the vehicle identifying information, the main controller may identify automotive components or parts corresponding to the vehicle V and transmit the information (or unlocking instructions) to the locker array 40 of FIG. 7 for a locker locking mechanism 46 to unlock a respective locker access door 44 and permit access to parts in a parts locker 42 that stores parts (e.g., oil filter, spark plugs, etc.) that specifically correspond to the vehicle V.

In one embodiment, the scanner 50 may be used to scan the vehicle identifying information C of the vehicle V and, based on the vehicle identifying information, the main controller may identify manufacturer's recommended maintenance procedures or service history of the vehicle V. This information may be shown to the owner O of FIG. 6 via the display 32 or the tablet 34.

Figure 9:
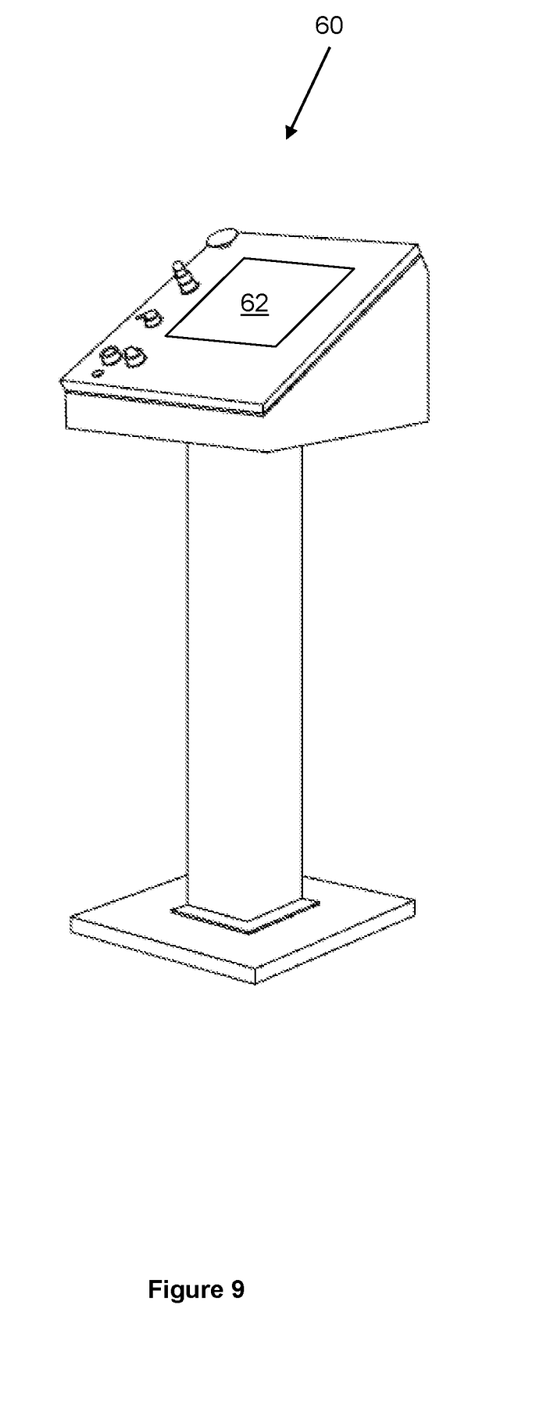
FIG. 9 illustrates a perspective view of an exemplary control panel of the service line of FIG. 1.

FIG. 9 illustrates a perspective view of an exemplary control panel 60 of the service line 1. An operator may use the control panel 60 to start and stop the conveyors 10.

In service, a technician may use the scanner 50 to scan vehicle identification information. Detailed specifications or history of the vehicle is previously stored or concurrently obtained (e.g., through the Internet) based on the vehicle identification information. Relevant information is then conveyed to the service technicians working on the service line 1. Each station 10 may include one or more operator interface panels 62, in electronic communication with the main controller. By way of example, information regarding a particular vehicle's optimum tire pressure may be transmitted to a station 10 performing tire maintenance while information regarding a particular vehicle's optimum oil amount may be transmitted to a different station 10 performing an oil change. Operator interface panels 62 provide the technicians with information regarding the services to be performed on each vehicle and its specifications.

Relevant information may also be conveyed to the parts locker array 40 and to the display 32 or tablet 34 as described above.

Figure 10:
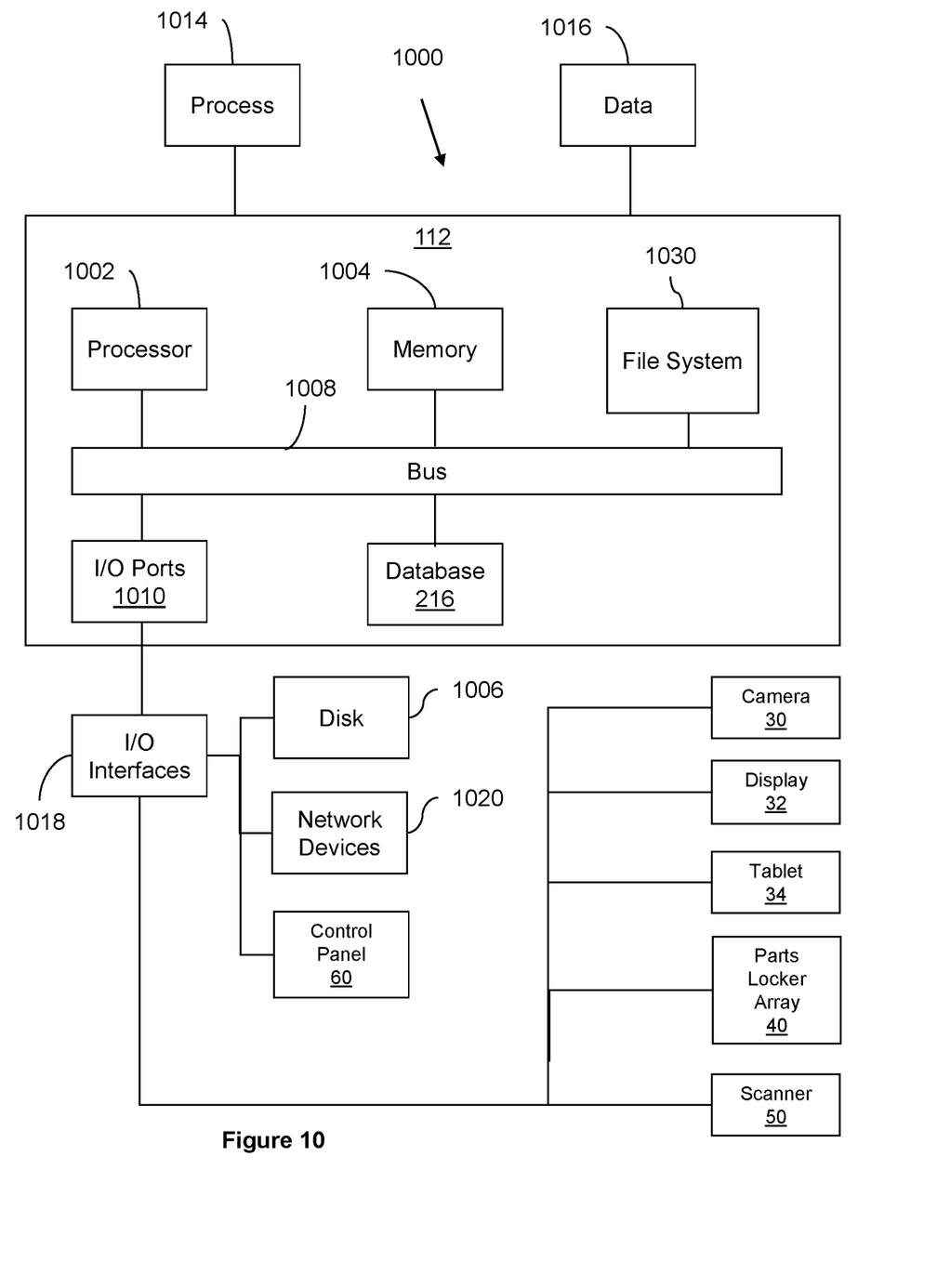
FIG. 10 illustrates a block diagram of an exemplary machine for a service line.

FIG. 10 illustrates a block diagram of an exemplary machine 1000 for a service line 1. The machine 1000 may include a processor 1002, a memory 1004, a database 1026, and I/O Ports 1010 operably connected by a bus 1008. In one example, the machine 1000 may receive or transmit input or output signals via, for example, I/O Ports 1010 or I/O Interfaces 1018 from or to, for example, the camera 30, the display 32, the tablet 34, the parts locker array 40, the scanner 50, and the main control panel 60. Thus, the camera 30, the display 32, the tablet 34, the parts locker array 40, the scanner 50, and the main control panel 60 may be implemented in machine 1000 as hardware, firmware, software, or a combination thereof and, thus, the machine 1000 and its components may provide means for performing functions described herein as performed by the camera 30, the display 32, the tablet 34, the parts locker array 40, the scanner 50, and the main control panel 60.

The processor 1002 can be a variety of various processors including dual microprocessor and other multi-processor architectures. The memory 1004 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1006 may be operably connected to the machine 1000 via, for example, an I/O Interfaces (e.g., card, device) 1018 and an I/O Ports 1010. The disk 1006 can include, but is not limited to, devices like a magnetic disk drive, a solid state disk drive, a floppy disk drive, a tape drive, a Zip drive, a flash memory card, or a memory stick. Furthermore, the disk 1006 can include optical drives like a CD-ROM, a CD recordable drive (CD-R drive), a CD rewriteable drive (CD-RW drive), or a digital video ROM drive (DVD ROM). The memory 1004 can store processes 1014 or data 1016, for example. The disk 1006 or memory 1004 can store an operating system that controls and allocates resources of the machine 1000.

The bus 1008 can be a single internal bus interconnect architecture or other bus or mesh architectures. While a single bus is illustrated, it is to be appreciated that machine 1000 may communicate with various devices, logics, and peripherals using other busses that are not illustrated (e.g., PCIE, SATA, Infiniband, 1394, USB, Ethernet). The bus 1008 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 1000 may interact with input/output devices via I/O Interfaces 1018 and I/O Ports 1010. Input/output devices can include, but are not limited to, a keyboard, a microphone, a pointing and selection device, cameras, video cards, displays, disk 1006, network devices 1020, and the like. The I/O Ports 1010 can include but are not limited to, serial ports, parallel ports, and USB ports.

The machine 1000 can operate in a network environment and thus may be connected to network devices 1020 via the I/O Interfaces 1018, or the I/O Ports 1010. Through the network devices 1020, the machine 1000 may interact with a network. Through the network, the machine 1000 may be logically connected to remote computers. The networks with which the machine 1000 may interact include, but are not limited to, a local area network (LAN), a wide area network (WAN), and other networks. The network devices 1020 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 1020 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities. In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Signal," as used herein, includes but is not limited to one or more electrical or optical signals, analog or digital signals, data, one or more computer or processor instructions, messages, a bit or bit stream, or other means that can be received, transmitted, or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A service system for servicing a vehicle, comprising:
at least one service station; and
a parts locker array disposed in or adjacent the at least one service station and including:
a plurality of parts lockers;
each parts locker including:
a locker access door configured to alternatively open and close to permit and impede, respectively, access to the parts locker's interior; and
a locker locking mechanism configured to alternatively lock and unlock to impede and permit, respectively, opening of the parts locker access door;
a locker array controller configured to communicate locker unlocking instructions based on validation of vehicle identifying information, wherein the locker array controller is configured to transmit the unlocking instructions to a specific one of the parts lockers based on the vehicle identifying information for a respective locker locking mechanism to unlock a respective locker access door to permit opening of the respective locker access door to permit access to parts in the specific one of the parts locker's interior that specifically correspond to the vehicle, wherein the at least one station includes at least one service substation selected from the group consisting of:

an oil change substation, a tire rotation substation, and a lift substation.

2. The service system of claim 1, wherein the at least one station includes:

an oil change substation including a hose and a vacuum-inducing device, the hose having a first end operably connected to a vacuum-inducing device and a second end, the oil change substation configured to, when the second end of the hose is introduced in an oil reservoir of the vehicle and the vacuum-inducing device is activated, suction out oil from the oil reservoir of the vehicle.

3. The service system of claim 1, wherein the at least one station includes:

at least one lift configured to lift the vehicle.

4. The service system of claim 1, comprising:

an optical scanner configured to scan the vehicle identifying information as recorded on a surface of the vehicle and to transmit the vehicle identifying information to the locker array controller.

5. The service system of claim 1, comprising:

an optical scanner configured to scan the vehicle identifying information from a surface of the vehicle;

a second controller operably connected to the scanner and configured to receive the vehicle identifying information from the scanner and, based on the vehicle identifying information, identify at least one of:

manufacturer's recommended maintenance procedures corresponding to the vehicle, and automotive components or parts corresponding to the vehicle.

6. The service system of claim 1, comprising:

an optical scanner configured to scan the vehicle identifying information from a surface of the vehicle;

a second controller operably connected to the scanner and configured to receive the vehicle identifying information from the scanner and, based on the vehicle identifying information, identify at least one of:

manufacturer's recommended maintenance procedures corresponding to the vehicle, and automotive components or parts corresponding to the vehicle; and the second controller configured to transmit to the locker array controller the at least one of:

the manufacturer's recommended maintenance procedures corresponding to the vehicle, and the automotive components or parts corresponding to the vehicle.

7. A service system for servicing a vehicle, comprising:

an automotive service station; and a locker array controller configured to communicate locker unlocking instructions based on validation of vehicle identifying information, wherein the locker array controller is configured to transmit the unlocking instructions to a specific one of parts lockers based on the vehicle identifying information for a respective locker locking mechanism to unlock a respective locker access door to permit opening of the respective locker access door to permit access to parts in the specific one of the parts locker's interior that specifically correspond to the vehicle, the automotive service station including at least one service substation selected from the group consisting of:

an oil change substation, a tire rotation substation, and a lift substation.

8. The service system of claim 7, wherein the automotive service station includes:

an oil change substation including a hose and a vacuum-inducing device, the hose having a first end operably connected to a vacuum-inducing device and a second end, the oil change substation configured to, when the second end of the hose is introduced in an oil reservoir of the vehicle and the vacuum-inducing device is activated, suction out oil from the oil reservoir of the vehicle.

9. The service system of claim 7, wherein the automotive service station includes:

at least one lift configured to lift the vehicle.

10. The service system of claim 7, comprising:

an optical scanner configured to scan the vehicle identifying information as recorded on a surface of the vehicle and to transmit the vehicle identifying information to the locker array controller.

11. The service system of claim 7, comprising:

a scanner configured to scan the vehicle identifying information from a surface of the vehicle;

a second controller operably connected to the scanner and configured to receive the vehicle identifying information from the scanner and, based on the vehicle identifying information, identify at least one of:

manufacturer's recommended maintenance procedures corresponding to the vehicle, and automotive components or parts corresponding to the vehicle.

12. The service system of claim 7, comprising:

a scanner configured to scan the vehicle identifying information from a surface of the vehicle;

a second controller operably connected to the scanner and configured to receive the vehicle identifying information from the scanner and, based on the vehicle identifying information, identify at least one of:

manufacturer's recommended maintenance procedures corresponding to the vehicle, and automotive components or parts corresponding to the vehicle; and the second controller configured to transmit to the locker array controller the at least one of:

the manufacturer's recommended maintenance procedures corresponding to the vehicle, and the automotive components or parts corresponding to the vehicle.

\* \* \* \* \*